United States Patent Office

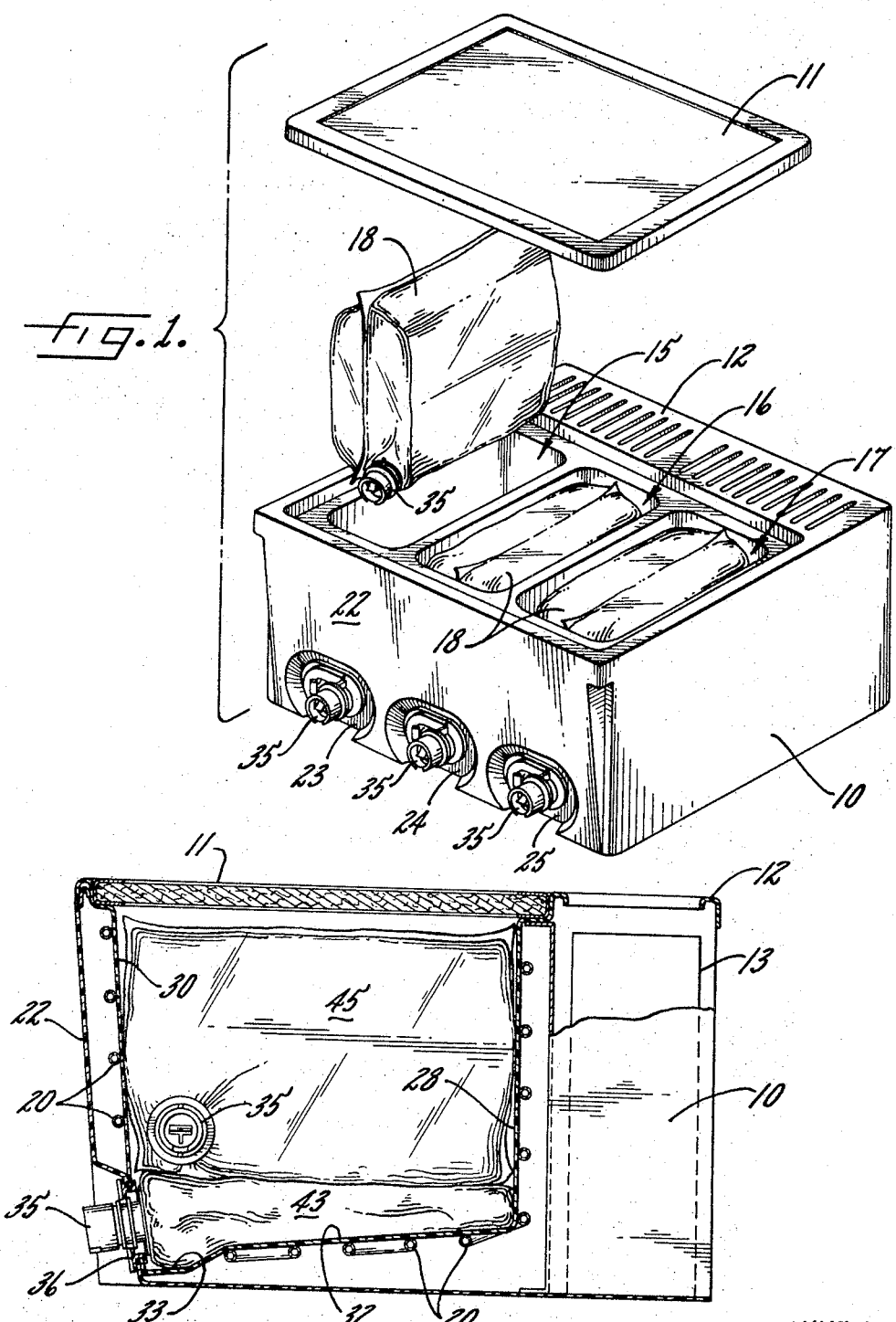

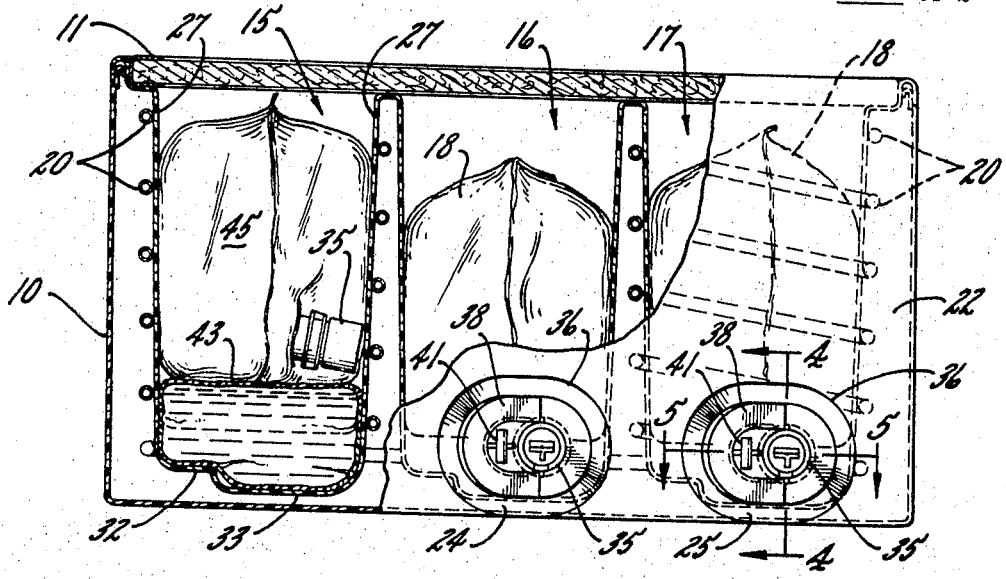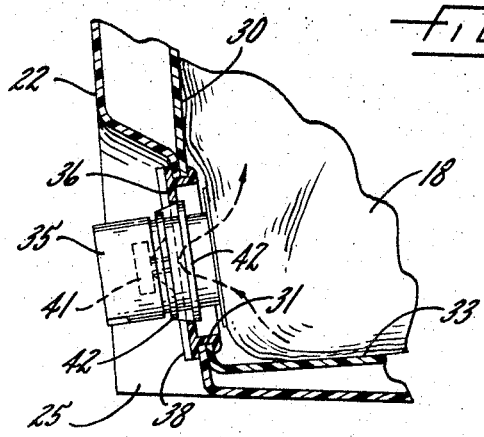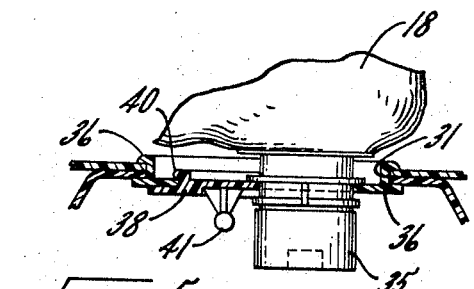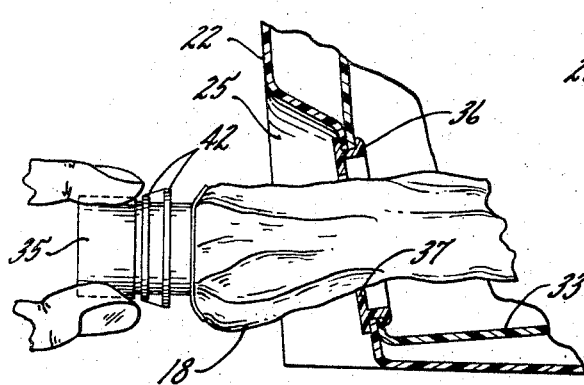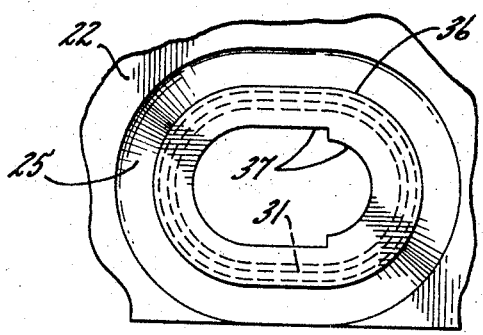

3,435,990
Patented Apr. 1, 1969

---

3,435,990
BEVERAGE DISPENSER AND METHOD OF REFILLING
Albert M. Pike, Jr., 165 S. Glenwood Place, Aurora, Ill. 60506
Filed Oct. 16, 1967, Ser. No. 675,655
Int. Cl. B67b 7/00; G01f; B65d 35/22
U.S. Cl. 222—1    6 Claims

ABSTRACT OF THE DISCLOSURE

A refrigerated beverage dispenser is described having individual tubs each adapted to receive a collapsible container of beverage liquid having a self-contained dispenser spout, each tub having an opening through which the dispenser spout may be positioned for use and through which the collapsed exhausted beverage container may be withdrawn and the dispenser of a full container positioned in its place.

---

This invention relates to beverage dispensers, and in particular to dispensers intended for use with pre-packaged liquid beverages. In its principal aspects it includes a dispenser for home use and a system of operation by which it may be periodically refilled with disposable containers of fresh beverage liquid.

Although beverage dispensing devices have come into wide commercial use, none has made a significant impact on the home market where the largest quantities of liquid beverages are actually consumed. There are several reasons why this is so. One principal cause is that the beverage dispensers heretofore available have been relatively large, complex, and expensive, thus making them economically unfeasible for home use. Another disadvantage is that the pre-packaged beverage containers used to fill such dispensers were also bulky, and relatively expensive. They did not represent a practical economic proposition for a home market which might often be widely distributed over a residential area in which a large number of beverage dispensers would necessarily have to be serviced at regular intervals by service personnel.

In spite of the foregoing problems, a substantial home market for commercially sold beverages does exist. Commercially successful delivery routes have long dealt in beverage products including milk, fruit juices, and other beverage products. However, these markets could generally be served only through the use of conventional glass, plastic, or waxed paper containers in the same manner as milk deliveries. While the demand for the beverage liquids has always been present, there has until now been no practical means of furnishing and servicing a beverage dispenser in the home which would put an end to the inconvenience and expense of returnable glass bottles, individual plastic and waxed paper cartons, and the like.

In view of the foregoing, it is a principal object of the present invention to provide a self-contained refrigerated beverage dispenser especially suited for home use which is adapted to receive and dispense relatively inexpensive disposable pre-packaged containers of beverage liquid, and in particular for use with non-rigid beverage containers which collapse as their contents are expelled.

A more particular object is to provide a beverage dispenser and method of refilling which allow one pre-packaged collapsible beverage container to be inserted into the dispenser prior to the time that the preceding container has been completely exhausted, and in which the user may then empty the partially exhausted package and withdraw it in a simple and convenient manner without disturbing the full container which had been stored awaiting use. Then, it is a further object to provide means for bringing the full package into use by merely drawing its dispensing apparatus into position for dispensing.

Other objects and advantages of the invention will be apparent from the following detailed description and from the drawings, in which:

FIGURE 1 is an exploded perspective view of a beverage dispenser constructed according to the present invention, including a full pre-packaged collapsible container of beverage liquid as it would appear during filling of the dispenser;

FIG. 2 is a side elevation in partial sections of the beverage dispenser of FIG. 1, illustrating a partially exhausted beverage package and a full package in storage above it;

FIG. 3 is a front elevation in partial section of the beverage dispenser of FIG. 1;

FIG. 4 is an enlarged fragmentary section of the dispenser spout and access door taken in the plane 4—4 of FIG. 3;

FIG. 5 is an enlarged fragmentary section of the dispenser spout and access door taken in the plane 5—5 of FIG. 3;

FIG. 6 is an enlarged detail view illustrating the dispenser spout adapter plate; and FIG. 7 is an enlarged detail view illustrating the means by which an exhausted beverage package may be removed from the dispenser.

While the invention will be described in connection with a particular preferred embodiment and procedure, it will be understood that it is not intended to so limit the invention, but it is instead intended to cover all alternative and equivalent constructions as defined by the appended claims.

Turning to the drawings, there is shown in FIG. 1 the beverage dispenser of the present invention having a body 10 and a cover 11. Beneath a protective panel 12 at the rear of the dispenser is a self-contained refrigerating apparatus 13 which is electrically powered and operates from ordinary house current in a known manner. Within the body 10 are a plurality of side walls and floor panels defining three individual tubs 15, 16, 17 which are used to contain individual pre-packaged containers 18 of liquid beverage. Refrigerating coils 20 coming from the refrigerating means 13 at the rear of the body 10 are disposed about the tubs of the dispenser in a manner which brings the refrigerating effect to each of the three tubs 15, 16, 17 for the cooling of their contents.

The body 10 of the dispenser is preferably about 24 inches wide, 21 inches deep, and 13 inches high, which is sufficiently compact to allow it to be placed on a counter, table, or other support in the home of the user. At the front of the machine is a face panel 22 containing individual dispenser openings 23, 24, 25. Each of the dispenser openings 23, 24, 25 is associated with an individual tub 15, 16, 17 within the body 10 of the dispenser. The walls of the body 10 as well as the cover 11 are provided with suitable insulation to minimize heat transfer from the outside which would otherwise diminish the refrigerating effect supplied by the refrigerating coils 20. When the cover 11 is lowered into place, the tubs 15, 16, 17 are thus enclosed and their contents protected.

Each individual tub 15, 16, 17 is formed with sides 27, a rear panel 28, and a front panel 30 having an outlet port 31 communicating with its respective opening 23, 24, 25 in the front panel 22. A floor 32 is provided which slopes forward toward the port 31, and terminates in an internal condensate catch trough 33. The latter is provided to accumulate condensation which may accumulate
::::

and run off from the walls of the tubs 15, 16, 17 or from the surfaces of the beverage containers 18 placed therein. The condensate trough 33 terminates in a suitable means (not shown) which disposes of the condensate in a manner which assures that it cannot leak out of the port and stain or discolor the front panel 22 of the dispenser.

As a principal feature of the invention, the dispenser is adapted to receive and dispense a beverage package consisting of a collapsible flexible plastic bag 18 which is fitted with a self-contained manually-operated dispensing valve 35. Such a container 18 is often referred to as a "bare-bag" package, meaning that the bag itself is shapeless and flexible and will conform itself to the shape of its container. Such a bag may be formed from any suitable thin sheet material plastic such as polyethylene or vinyl and may have more or less of its own shape depending upon the stiffness of the material used. However, as a principal advantage of the invention the thinness and flexibility of the beverage container 18 allows it to make intimate contact with a large proportion of the chilled wall surfaces of the tubs 15, 16, 17 while being contained therein, thereby providing a marked increase in heat transfer efficiency and allowing the beverage to be more quickly cooled and maintained at drinking temperature by the cooling coils 20.

As a further feature of the invention, the use of the flexible or semi-rigid beverage container 18 allows it to collapse during use to an extent which permits the next full container package of beverage liquid to be inserted into the dispenser and stored therein in readiness for use while the contents of the preceding partially empty container are exhausted. For this purpose, the access port opening 31 in the forward end of each of the tubs 15, 16, 17 is made sufficiently large so that the self-contained dispensing valve 35 on the beverage package 18 may be easily threaded therethrough. For this purpose, the dispenser neck openings 23, 24, 25 are each formed in an adapter panel 36 which fits over the front opening of each cut-out access port 31. Each adapter panel has a larger access opening 37 adjacent to and communicating with its respective neck opening 23, 24, 25 and closed with a removable door 38 such that when the door 38 is removed, the adjacent openings define a keyhole-shaped access port. The removable door 38 simply snaps in and out of grooves 40 provided in the adapter panel opening 37, and is provided with a suitable handle 41 for easy gripping. When in place, the door 36 securely anchors the dispensing valve 35 in place for use through the engagement of circumferential flanges 42 provided on the valve for this purpose. The adapter panel 36 and door 38 can advantageously be made of a clear plastic material such as butyrate to allow visual identification of the beverage contents of each of the tubs 15, 16, 17 by the user.

Further in accordance with the invention, pressure is maintained to expel the contents of a partially empty container 43 through the use of the next full container 18 which is also kept chilled during storage. As best seen in FIG. 2, the collapse of the container 43 creates an open volume in the tub when the contents of the emptying container 43 becomes sufficiently depleted to impair the pressure head available to expel the beverage through the dispensing valve 35 at the desired rate. This open volume is then utilized for the storage of the next full container package 45 of beverage to be used. The advantages of this utilization are doubled through the increased dispensing pressure in the emptying container 43 due to the weight of the full container 45 atop it.

As a further feature of the invention, an exhausted container package 18 of beverage liquid is simply removed from the dispenser by withdrawing it through the access port 31 of its associated tub 15, 16, 17. This is done by opening the access door 36, grasping the dispensing valve 35 and disengaging it from the adapter panel 36, and drawing it outward from the dispenser. The flexible bag container 18, its contents having been exhausted, is now easily collapsed into a wrinkled and rope-like skein which may be withdrawn through the port opening 31 of its associated tub very much like a deflated balloon. The next full container 18 then drops down into position and its dispenser valve 35 can simply be grasped through the opening 37 and drawn into place. It is then slipped into place and secured by again closing the access door 36. The full container package is then ready for use, and the exhausted container or bag can then simply be thrown away.

It will be apparent that numerous advantages are obtained from the foregoing procedure. As the emptying collapsible beverage container package 43 decreases in volume as its contents are expelled, a new package 45 of beverage may be placed into the tub atop the partially exhausted one, and the pressure of the full bag helps to expel the contents of the partially empty one beneath. In this way an adequate dispensing pressure is maintained throughout the dispensing cycle of each individual container package 18, provided only that a full container is placed atop the emptying one as it collapses. This leads to advantages in the maintenance and servicing of such dispensers since the beverage salesman or deliveryman, or even the housewife herself, can replenish each of the tubs at convenient times, rather than only when the beverage in a particular tub is exhausted. As a container 18 becomes exhausted, it is simply removed through the opening 36 in the front panel 22 of the body 10 as previously described, and the next full container 18 threaded into place and locked into the dispenser opening in the manner described.

A further feature of the invention lies in maintaining the beverage liquid within the dispenser spout 35 at a cool temperature. For this purpose, convection currents are set up which continuously replenish the spout area with fresh liquid, as shown in FIG. 4. The spout 35 is angled downward from its associated tub for this prupose. Heat entering the spout area due to the lack of insulation gives rise to the desirable convection currents which replenish the fluid.

The following is claimed as invention:

1. In a beverage dispenser having a body with a refrigerated tub having an access port at the bottom thereof, said tub being adapted to receive a flexible collapsible container package of beverage liquid including a self-contained dispenser spout, the method of use comprising the steps of inserting a first package of beverage liquid into said tub, positioning said dispenser spout in said port, withdrawing a portion of the beverage contents of said package, placing a second package in said tub atop the first partially expended package, withdrawing the remaining contents of the first package under the increased pressure of the second full package, removing the first package when its contents are exhausted, and positioning the second package and its dispenser spout with respect to said port for use.

2. The method of claim 1 in which the exhausted first package is withdrawn from the dispenser by collapsing said package into a rope-like skein and pulling through the access port, after which withdrawal said second full package is positioned for use.

3. A beverage dispenser comprising, in combination, a tub, refrigeration means for cooling the inner surfaces of said tub, an insulated body surrounding the sides and bottom of said tub, an insulated cover overlying said tub, said tub having an access port at the bottom thereof and said body having an opening communicating therewith, a flexible collapsible container package for beverage liquid having a self-contained dispenser spout, said package being contained and supported within said tub in intimate surface contact therewith and said dispenser spout protruding through said access port, said container package only partially filling said tub when in the full condition, and a second similar container package placed in said tub atop a first partially expended package to forcibly expel the contents of said first package under increased pressure.

4. The combination defined in claim 3 in which said dispenser spout is located at a downward angle whereby convection currents are induced which continuously replenish the liquid therein.

5. A beverage dispenser as defined in claim 3 in which said tub has a floor panel sloping downwardly toward said access port and terminating in an internal condensate catch trough.

6. A beverage dispenser as defined in claim 3 including removable panel means fastenable within said access port for selectively securing said dispenser spout, said panel means having a transparent portion whereby the contents of a beverage container package therein may be visually determined.

References Cited

UNITED STATES PATENTS

| | | | |
|---|---|---|---|
| 1,608,724 | 11/1926 | Cox | 222—158 X |
| 2,151,104 | 3/1939 | Heitman | 222—183 X |
| 3,185,348 | 5/1965 | Pollack et al. | 222—146 X |

ROBERT B. REEVES, *Primary Examiner.*

H. S. LANE, *Assistant Examiner.*

U.S. Cl. X.R.

222—94, 146, 158, 183